United States Patent
Kushiro et al.

(10) Patent No.: US 8,548,681 B2
(45) Date of Patent: Oct. 1, 2013

(54) POWER STEERING DEVICE

(75) Inventors: Ikuo Kushiro, Mishima (JP); Kimiaki Ono, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 185 days.

(21) Appl. No.: 13/130,587

(22) PCT Filed: Dec. 26, 2008

(86) PCT No.: PCT/JP2008/073742
§ 371 (c)(1),
(2), (4) Date: May 23, 2011

(87) PCT Pub. No.: WO2010/073371
PCT Pub. Date: Jul. 1, 2010

(65) Prior Publication Data
US 2011/0231065 A1   Sep. 22, 2011

(51) Int. Cl.
*G06F 19/00* (2011.01)
(52) U.S. Cl.
USPC .......... 701/41; 701/36; 701/42; 701/70; 701/72; 701/82; 180/197; 180/244; 180/404; 180/415; 180/446; 137/625.23; 137/625.24; 403/124; 403/137
(58) Field of Classification Search
USPC ........ 701/36, 41, 42, 70, 72, 82, 90; 180/197, 180/244, 404, 415, 446; 137/625.23, 625.24; 403/124, 137; 74/388; 303/146; 90/252, 90/422; 91/375 A
See application file for complete search history.

(56) References Cited

U.S. PATENT DOCUMENTS

| | | | |
|---|---|---|---|
| 6,131,693 A | 10/2000 | Mukai et al. | |
| 6,401,019 B2 * | 6/2002 | Ikemoto | 701/41 |
| 6,450,287 B1 * | 9/2002 | Kurishige et al. | 180/446 |
| 6,490,514 B2 * | 12/2002 | Kurishige et al. | 701/41 |
| 6,542,800 B2 * | 4/2003 | Kawazoe et al. | 701/41 |
| 6,597,975 B1 * | 7/2003 | Shinmura et al. | 701/48 |
| 6,631,782 B1 * | 10/2003 | Rieger | 180/446 |
| 6,883,637 B2 * | 4/2005 | Nishizaki et al. | 180/446 |
| 6,952,635 B2 * | 10/2005 | Yasui et al. | 701/41 |
| 7,540,351 B2 * | 6/2009 | Kataoka et al. | 180/446 |

(Continued)

FOREIGN PATENT DOCUMENTS

| | | |
|---|---|---|
| JP | 62 178275 | 11/1987 |
| JP | 3 50585 | 5/1991 |

(Continued)

OTHER PUBLICATIONS

Hsu et al., Development of Active Steering Angle Control based on Electric Power Steering Systems, 2011, IEEE, p. 1-6.*

(Continued)

*Primary Examiner* — McDieunel Marc
(74) *Attorney, Agent, or Firm* — Oblon, Spivak, McClelland, Maier & Neustadt, L.L.P.

(57) ABSTRACT

A power steering device is mounted on a vehicle and includes a torque applying unit and an applied friction torque changing unit. The torque applying unit sets an applied friction torque applied to a steering wheel based on a real steering angle and a target steering angle, and performs a control of applying the applied friction torque to the steering wheel. The applied friction torque changing unit changes the applied friction torque based on a load condition of the vehicle.

7 Claims, 5 Drawing Sheets

(56) References Cited

U.S. PATENT DOCUMENTS

| | | | |
|---|---|---|---|
| 7,571,033 B2 * | 8/2009 | Fujioka et al. | 701/33.8 |
| 7,826,950 B2 * | 11/2010 | Tamaizumi et al. | 701/42 |
| 8,050,839 B2 * | 11/2011 | Hitosugi et al. | 701/80 |
| 2007/0017735 A1 | 1/2007 | Kataoka et al. | |

FOREIGN PATENT DOCUMENTS

| | | |
|---|---|---|
| JP | 5 85382 | 4/1993 |
| JP | 11 59468 | 3/1999 |
| JP | 11 263233 | 9/1999 |
| JP | 2000 142442 | 5/2000 |
| JP | 2002 104210 | 4/2002 |
| JP | 2007 22373 | 2/2007 |
| JP | 2007 302050 | 11/2007 |
| JP | 2008 189006 | 8/2008 |

OTHER PUBLICATIONS

Yang, Effect of Yaw Velocity Feedback in Electric Power Steering System on Handling Stability of Vehicle, 2011, IEEE, p. 260-262.*

Morita et al., Improvement of Steering Feel of Electric Power Steering System with Variable Gear Transmission System using Decoupling Control, 2011, IEEE, p. 417-422.*

Yu et al., Analysis and Experimental Verification for Dynamic Modeling of a Skid-Steered Wheeled Vehicle, 2010, IEEE, p. 340-353.*

International Search Report issued Apr. 7, 2009 in PCT/JP08/73742 filed Dec. 26, 2008.

* cited by examiner

POWER STEERING DEVICE

TECHNICAL FIELD

The present invention relates to a power steering device which controls an applied friction torque applied to a steering wheel.

BACKGROUND TECHNIQUE

This kind of technique is proposed in Patent Reference-1, for example. In Patent Reference-1, there is proposed a technique which applies a friction torque to a steering wheel in accordance with a steering angle and a vehicle speed, in order to improve a characteristic of returning the steering wheel at low speed and astringency of the steering wheel at high speed.
Patent Reference-1: Japanese Patent Application Laid-open under No. 2002-104210

DISCLOSURE OF INVENTION

Problem to be Solved by the Invention

There is a case where a steering-response varies due to load conditions of the vehicle. For example, a steering-response of a vehicle having a heavy load tends to be heavier than a vehicle having a light load. In addition, the steering feeling also varies due to such load conditions that the front wheels have a heavier load than the rear wheels, and that the vehicle has a load difference between the right and left sides. Therefore, there is a possibility that the applied friction torque which is calculated from a steering angle and a vehicle speed is not best. Patent Reference-1 does not refer to the above problem and a means for solving the problem.

The present invention has been achieved in order to solve the above problem. It is an object of this invention to provide a power steering device capable of properly executing a control of applying the applied friction torque to the steering wheel in consideration of load conditions of the vehicle.

Means for Solving the Problem

According to one aspect of the present invention, there is provided a power steering device mounted on a vehicle including: a torque applying unit which sets an applied friction torque applied to a steering wheel based on a real steering angle and a target steering angle, and which performs a control of applying the applied friction torque to the steering wheel; and an applied friction torque changing unit which changes the applied friction torque based on a load condition of the vehicle.

The above power steering device is mounted on a vehicle and includes a torque applying unit and an applied friction torque changing unit. The torque applying unit is an ECU (Electronic Control Unit) for example, and sets the applied friction torque applied to the steering wheel based on the real steering angle and the target steering angle, and performs the control of applying the applied friction torque to the steering wheel. The applied friction torque changing unit is an ECU for example, and changes the applied friction torque based on the load condition of the vehicle. Thereby, the power steering device can apply a proper applied friction torque to the steering wheel, and can prevent the steering feeling from changing due to the load condition of the vehicle.

In a manner of the above power steering device, the applied friction torque changing unit reduces the applied friction torque when a total load of the vehicle is large, compared to a time when the total load is small. Generally, when a total load of the vehicle is large, the steering is heavy compared to the time when the total load of the vehicle is small. Thus, in this manner, the power steering device can apply a proper applied friction torque to the steering wheel.

In another manner of the above power steering device, the applied friction torque changing unit increases the applied friction torque when a load distribution of rear wheels is large, compared to a time when the load distribution is small. When a load distribution of rear wheels is large, the steering is unstable, i.e., the capability of keeping the steering wheel weakens, compared to the time when the load distribution is small, and there is a possibility for the vehicle to get unstable. Thus, in this manner, by increasing the applied friction torque when the load distribution of the rear wheels is large, the applied friction torque changing unit properly adjusts the steering and achieves the stability of the vehicle.

In another manner of the above power steering device, the applied friction torque changing unit increases the applied friction torque when a load difference between the right and left sides of the vehicle is large, compared to a time when the load difference is small. When the load difference between the right and left sides of the vehicle is large, compared to the time when the load difference is small, keeping the steering wheel is more difficult and there is a possibility for the vehicle to get unstable. Thus, in this manner, by increasing the applied friction torque when the load difference between the right and left sides is large, the applied friction changing unit can properly adjust the steering and achieve the stability of the vehicle.

In another manner of the above power steering device, the applied friction torque changing unit changes the applied friction torque based on a condition of the vehicle in terms of acceleration and deceleration. The load condition of the vehicle varies according to the condition of the vehicle in terms of acceleration and deceleration. Thus, in this manner, the power steering device applies the proper friction torque to the steering wheel based on the condition of the vehicle in terms of acceleration and deceleration.

In another manner of the above power steering device, the applied friction torque changing unit increases the applied friction torque when the vehicle is accelerating. In this manner, the applied friction torque changing unit increases the applied friction torque because the load of front wheels decreases in the vehicle accelerating. Thereby, the power steering device enhances the capability of keeping the steering wheel and stabilizes the vehicle.

BRIEF DESCRIPTION OF THE REFERENCE NUMBER

1 Steering wheel
2 Steering shaft
3 Steering angle sensor
4 Steering torque sensor
5 Pinion
6 Steering rack
7 Motor
8 Motor rotation angle sensor
12 Wheels
15 Vehicle speed sensor
16 suspension stroke sensors
30 Controller
50 Steering control system

DETAILED DESCRIPTION OF THE PREFERRED EMBODIMENTS

Preferred embodiments of the present invention will be explained hereinafter with reference to the drawings.

[Device Configuration]

Figure 1:
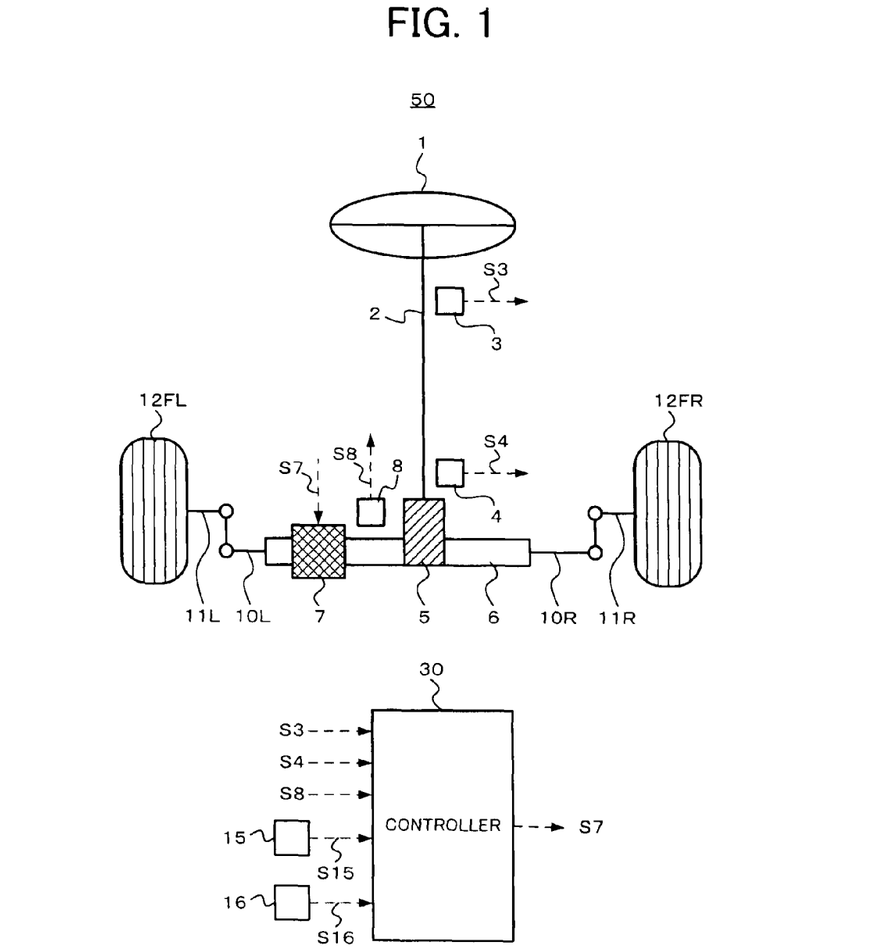
FIG. 1 is a schematic diagram illustrating a configuration of a steering control system to which a power steering device according to an embodiment is applied.

First, a description will be given of an entire configuration of a system (hereinafter referred to as "steering control system") 50 to which a power steering device according to the embodiment is applied. FIG. 1 is a schematic diagram showing a configuration of the steering control system 50.

The steering control system 50 mainly includes a steering wheel 1, a steering shaft 2, a steering angle sensor 3, a steering torque sensor 4, a pinion 5, a steering rack 6, a motor 7, a motor rotation angle sensor 8, tie rods 10R and 10L, knuckle arms 11R and 11L, wheels (front wheels) 12FR and 12FL, a vehicle speed sensor 15, suspension stroke sensors 16, and a controller 30. Hereinafter, when each of the tie rods 10R and 10L, each of the knuckle arms 11R and 11L, and each of the wheels 12FR and 12FL are not distinguished from each other, "R" and "L" at the end of the reference numerals will be omitted. In addition, rear wheels (not shown) corresponding to the wheels 12FR and 12FL are hereinafter referred to as wheels 12RR, 12RL.

The steering control system 50 is formed by the electric power steering (EPS: Electric Power Steering) system. Concretely, the steering control system 50 is mounted on a vehicle, and steers the front wheels 12F (steered wheels) in accordance with the operation of the steering wheel 1.

The steering wheel 1 is operated by the driver for turning the vehicle. The steering wheel 1 is connected to the pinion 5 via the steering shaft 2. The steering angle sensor 3 and the steering torque sensor 4 are mainly provided on the steering shaft 2.

The pinion 5 rotates in response to the rotation of the steering shaft 2. The steering rack 6 moves in response to the rotation of the pinion 5. The knuckle arms 11 are connected to the steering rack 6 via the tie rods 10, and the wheels 12F are connected to the knuckle arms 11. In this case, when the tie rods 10 and the knuckle arms 11 are operated by the steering rack 6, the wheels 12F connected to the knuckle arms 11 are steered.

The motor 7 may be a three-phase AC motor, for example. The motor 7 is provided within the steering-gear box (not shown) and is coaxial with the steering rack 6. The motor 7 can apply a force which assists the movement of the steering rack 6 or a force which prevents the movement of the steering rack 6. Concretely, the motor 7 generates the assist torque in the steering direction by the driver in order to improve the steering feeling and the steering stability. In contrast, the motor 7 generates the applied friction torque in a direction opposite to the steering direction by the driver in order to improve the steering keeping performance. In other words, the motor 7 applies a steering reaction force. The motor 7 is controlled by a control signal S7 supplied by the controller 30.

Various kinds of sensors provided within the steering control system 50 function as follows. The steering angle sensor 3 detects the steering angle corresponding to the operation of the steering wheel 1 by the driver, and supplies a detecting signal S3 corresponding to the detected steering angle to the controller 30. The steering torque sensor 4 detects the steering torque generated by the operation by the driver, and supplies the controller 30 with a detecting signal S4 corresponding to the detected steering torque. The motor rotation angle sensor 8 detects the rotation angle of the motor 7, and supplies the controller 30 with a detecting signal S8 corresponding to the detected rotation angle. The vehicle speed sensor 15 detects the vehicle speed (for example, by detecting the wheel speed), and supplies the controller 30 with a detecting signal S15 corresponding to the detected vehicle speed.

The suspension stroke sensors 16 measure expansion-and-contraction conditions of suspensions, i.e., stroke amounts of the suspensions which are not shown and which are respectively provided on each of the wheels 12FR, 12FL, 12RR, 12RL. The suspension stroke sensors 16 supply detecting signals S16 to the controller 30. The suspension stroke sensors 16 are respectively provided on each of the wheels 12FR, 12FL, 12RR, 12RL for example. Hereinafter, the stroke amount of the suspension corresponding to the wheel 12FR is referred to as "stroke amount FR", and the stroke amount of the suspension corresponding to the wheel 12FL is referred to as "stroke amount FL", and the stroke amount of the suspension corresponding to the wheel 12RR is referred to as "stroke amount RR", and the stroke amount of the suspension corresponding to the wheel 12RL is referred to as "stroke amount RL".

The controller 30 includes a CPU, a ROM, a RAM, and an A/D converter, which are not shown. The controller 30 executes the control of the motor 7 by supplying the motor 7 with the control signal S7 based on the detecting signals S3, S4, S8, S15 and S16, supplied from the above-mentioned various kinds of sensors. In this embodiment, the controller 30 executes the control of making the motor 7 apply the applied friction torque to the steering wheel 1 (hereinafter, the control is referred to as "friction applying control"). In this way, the controller 30 functions as the power steering device in the present invention. The controller 30 may be realized by the ECU (Electronic Control Unit), which controls the vehicle.

[Example of Friction Applying Control]

Now, a description will be given of an example of the friction applying control performed by the controller 30. First, the controller 30 calculates the friction torque (hereinafter expressed by "$T_f$") applied to the steering wheel 1 based on the steering angle (hereinafter expressed by "$\theta$") and the vehicle speed (hereinafter expressed by "V"). Next, the controller 30 calculates the target steering angle (hereinafter expressed by "$\theta_t$") based on the steering angle $\theta$ and the friction torque $T_f$. Then, the controller 30 calculates the applied friction torque (hereinafter expressed by "$T_c$") based on the deviation (hereinafter expressed by "$\Delta\theta$") between the target steering angle $\theta_t$ and the steering angle $\theta$. In other words, the controller 30 corrects the friction torque $T_f$ based on the target steering angle $\theta_t$, and sets the corrected friction torque to the applied friction torque $T_c$. Then, the controller 30 executes the control of the motor 7 such that the above applied friction torque $T_c$ is applied to the steering wheel 1.

Now, a concrete description will be given of the friction applying control, with reference to FIG. 2 to FIG. 4.

Figure 2:
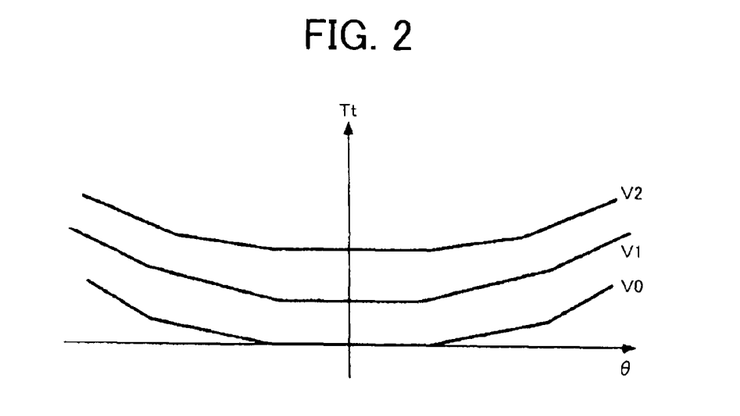
FIG. 2 is a diagram illustrating an example of a method for calculating the friction torque.

FIG. 2 shows an example of a method for calculating the friction torque $T_t$. In FIG. 2, a horizontal axis shows the steering angle θ, and a vertical axis shows the friction torque $T_t$. More concretely, FIG. 2 corresponds to maps defining the friction torque $T_t$ to be set with respect to the steering angle θ. Here, as an example, FIG. 2 shows the maps which corresponds to a high speed range V2, a middle speed range V1 and a low speed range V0, respectively. The controller 30 calculates the friction torque $T_t$ corresponding to the present steering angle θ and the vehicle speed V by referring to the maps mentioned above.

According to the maps shown in FIG. 2, if the steering angle θ is constant, the greater the vehicle speed is, the greater the friction torque $T_t$ set becomes. The reason is as follows. In the high speed range V2 or the middle speed range V1, it is desirable to generate a relatively-large friction torque in terms of the improvement of stability in traveling straightforward as well as the reduction of the power and the improvement of stability in maintaining the steering angle. On the contrary, in the low speed range V0, the increased friction torque $T_t$ tends to bring a strange feeling to the driver and thus degrades the steering feeling. Further, according to the maps shown in FIG. 2, if the vehicle speed is constant or in the same vehicle-speed range, the greater the steering angle θ is, the greater the set friction torque $T_t$ becomes. This is because a large lateral load tends to be generated due to the increased steered angle of the wheel when the magnitude of the steering angle θ is large, and thus a large friction torque is required in terms of the reduction of the power required to maintain the steering angle and the improvement of stability in maintaining the steering angle.

Next, a description will be given of a method for calculating the target steering angle $θ_t$ based on the friction torque $T_t$ calculated as described above. The controller 30 calculates the target steering angle $θ_t$ based on the deviation $Δθ$ $(=θ_t-θ)$ between the target steering angle $θ_t$ and the steering angle θ, and the upper limit value of the deviation $Δ$ $(=T_t/K)$ defined by the friction torque $T_t$ and a gain K. Concretely, the controller 30 initializes the target steering angle $θ_t$ to the steering angle θ at first (does not initialize if the target steering angle $θ_t$ has already been initialized). Then, the controller 30 calculates the deviation $Δθ(=θ_t-θ)$. Thereafter, if the controller 30 determines "$Δθ>Δ$", the controller 30 changes the target steering angle $θ_t$ to "$θ_t=θ+Δ$". If the controller 30 determines "$Δθ<-Δ$", the controller 30 changes the target steering angle $θ_t$ to "$θ_t=θ-Δ$". If the controller 30 determines "$-Δ≤Δθ≤Δ$", the controller 30 does not change the target steering angle $θ_t$. Here, the gain K is a value determined in consideration of rigidity of the steering system, for example.

Next, a description will be given of a method for calculating the applied friction torque $T_c$ based on the target steering angle $θ_t$ calculated as described above. The controller 30 calculates the applied friction torque $T_c$ based on the deviation $Δθ(=θt-θ)$ obtained by the target steering angle $θ_t$ and the gain K $(=T_t/Δ)$. Concretely, the controller 30 calculates the applied friction torque $T_c$ by the following formula: "$T_c=K·Δθ$", namely "$T_c=K(θ_t-θ)$".

Figure 3:
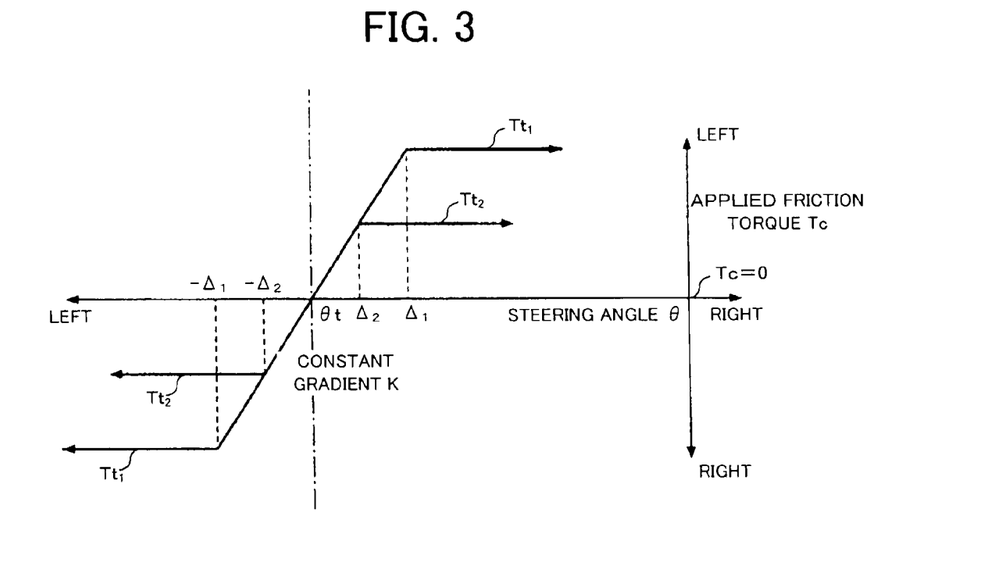
FIG. 3 is a diagram illustrating an example of characteristics of the applied friction torque.

FIG. 3 is a diagram illustrating an example of characteristics of the applied friction torque $T_c$. In FIG. 3, the horizontal axis shows the steering angle θ, and the vertical axis shows the applied friction torque $T_c$ (the torque of the left turn direction is defined as a positive torque, and the torque of the right turn direction is defined as a negative torque). Here, there are shown a case where the friction torque $T_t$ is "$T_{t1}$" and a case where the friction torque $T_t$ is "$T_{t2}$"($T_{t2}<T_{t1}$), as examples. For example, FIG. 3 shows the friction torque "$T_{t1}$" when the vehicle speed is in the high speed range V2 or middle speed range V1, and the friction torque "$T_{t2}$" when the vehicle speed is in the low speed range V0 (See. FIG. 2). Further, in FIG. 3, in either case of "$T_{t1}$" and "$T_{t2}$", for better understanding and for the sake of convenience, it is assumed that the target steering angle $θ_t$ is constant and is not changed by the change of the steering angle θ. It is noted that if the target steering angle $θ_t$ changes, then the graph is merely translated along the horizontal axis according to a new target steering angle $θ_t$.

As shown in FIG. 3, since the upper limit value of the deviation $Δ$ has the relationship "$Δ=T_t/K$", the greater the friction torque $T_t$ is, the greater the upper limit value of the deviation $Δ$ becomes (for example, the upper limit value of the deviation $Δ_1$ in the case of "$T_{t1}$" is larger than the upper limit value of the deviation $Δ_2$ in the case of "$T_{t2}$". Further, in the range of "$-Δ≤Δθ≤Δ$", the target steering angle $θ_t$ is kept unchanged, and the magnitude of the applied friction torque $T_c$, increases in proportion to $Δθ$ because of the relationship "$T_c=K·Δθ$", i.e., "$T_c=K(θ_t-θ)$". In the range of "$Δθ>Δ$" and "$Δθ<-Δ$", the target steering angle $θ_t$ is changed as mentioned above and the magnitude of $Δθ$ becomes constant. Thus, because of the relationship "$T_c=K·Δθ$", i.e., "$T_c=K(θ_t-θ)$", the magnitude of the applied friction torque $T_c$ becomes a constant value according to the friction torque $T_t$. In this case, in the range of "$-Δ≤Δθ≤Δ$", the friction torque $T_t$ to be applied to the steering wheel 1 is not actually applied to the steering wheel 1. The magnitude of the applied friction torque $T_c$ is set to the magnitude of the friction torque $T_t$ to be applied to the steering wheel 1 only when an absolute value of $Δθ$ becomes equal to or larger than the upper limit value of the deviation $Δ$. In the range of "$-Δ≤Δθ≤Δ$", the friction torque $T_t$ is not applied to the steering wheel 1 so that the sensitive vibration of the friction torque and the degradation of the steering feeling can be suppressed.

Figure 4A:
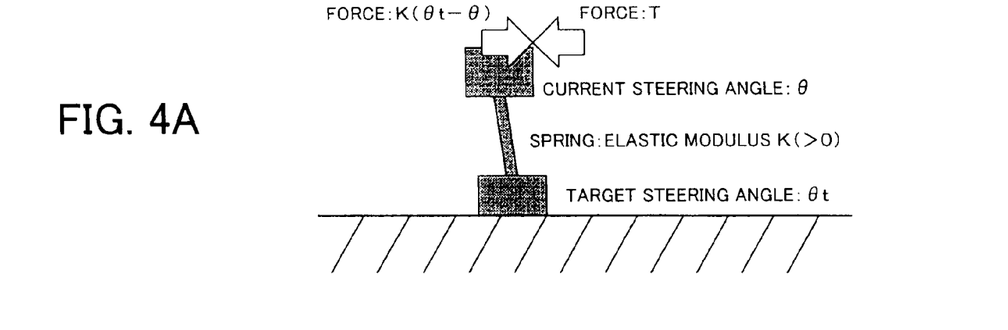
FIGS. 4A and 4B are image diagrams of a model for visualizing the characteristics of the applied friction torque.
Figure 4B:
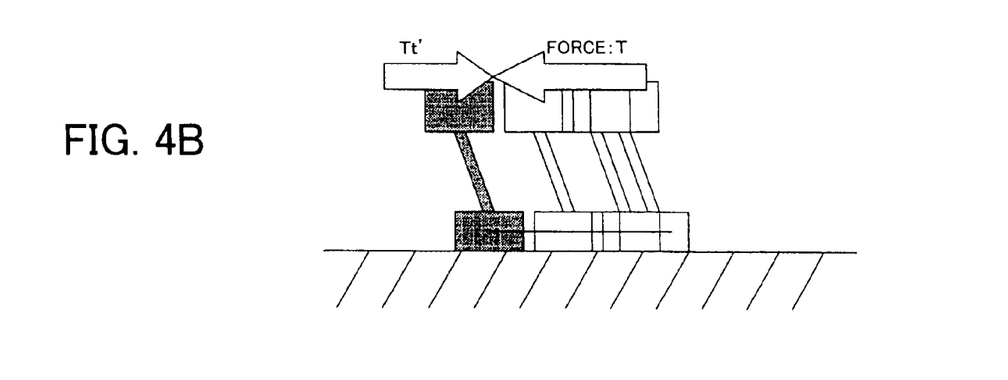

FIGS. 4A and 4B show image diagrams of a model for visualizing the characteristics of the applied friction torque $T_c$. FIG. 4A is an image diagram corresponding to the range of "$-Δ≤Δθ≤Δ$". In this case, the target steering angle $θ_t$ does not change, and a force which is balanced with a force T (for example, an external force generated due to an input to the vehicle wheel), i.e., an elastic force $(=K·Δθ)$ when a spring having an elastic modulus K $(=gain K)$ deforms by the amount of deformation $(θ_t-θ)$, is generated. FIG. 4B is an image diagram corresponding to the range of "$Δθ>Δ$" and "$Δθ<-Δ$". In this case, the target steering angle $θ_t$ changes in a direction where the force T is applied to the target steering angle $θ_t$, and a constant friction force $T_t'$ (which is smaller than the force T) is generated in an opposite direction of the force T. Here, the friction force $T_t'$ corresponds to a value obtained by converting the friction torque $T_t$ to a force dimension.

In the following first to third embodiments, a description will be given of the methods which change the above-mentioned applied friction torque $T_c$ to a more proper value in view of load conditions of the vehicle.

First Embodiment

Now, a description will be given of a method which changes the applied friction torque $T_c$ according to the first embodiment. In the first embodiment, the controller 30 changes the applied friction torque $T_c$ based on the total load of the vehicle and/or the load distribution of the rear wheels calculated from the detected stroke amounts FL, FR, RL, RR. Thereby, the controller 30 sets the applied friction torque $T_c$ considering the load conditions of the vehicle, and realizes a proper steering feeling according to the load conditions of the vehicle.

First, in this embodiment, the controller 30 estimates the load conditions of the vehicle from the detected stroke amounts FL, FR, RL, RR. Hereinafter, a description will be given of an example of a method for estimating the load conditions. For example, the controller 30 prepares a map or an equation which shows correspondences between the load on the vehicle and the stroke amount of the suspension beforehand by experimental trials, and stores it in a memory in advance. Then, the controller 30 estimates the loads on the wheel 12FR, 12FL, 12RR, 12RL from the detected stroke amounts FL, FR, RL, RR with reference to the above map or the equation. Hereinafter, a sum of the loads on the wheels 12FR and 12FL is referred to as "front-wheel load Wf", and a sum of the loads on the wheels 12RR and 12RL is referred to as "rear-wheel load Wr". In addition, a sum of the loads on the wheels 12FR, 12FL, 12RR, 12RL is referred to as "total load W".

Next, the controller 30 changes the applied friction torque $T_c$ based on the load conditions estimated. Concretely, after calculating the applied friction torque $T_c$ as described in the section "Example of Friction Applying Control", the controller 30 changes the applied friction torque $T_c$ based on the front-wheel load Wf and the rear-wheel load Wr. Hereinafter, a description will be given of three concrete methods for the controller 30 changing the applied friction torque $T_c$ (hereinafter, referred to as "first method", "second method", and "third method" for convenience of explanation). Here, the third method is a combination of the first method and the second method.

(First Method)

Now, a description of the first method will be given. According to the first method, in order to compensate for the steering wheel 1 getting hard to turn, the controller 30 reduces the applied friction torque $T_c$ when the controller 30 determines that the total load W is large. As the load on a vehicle becomes heavier, the steering capability gets worse. Thus, the controller 30 reduces the applied friction torque $T_c$ if the total load W is larger than a predetermined criterion value W0 (hereinafter, referred to as "standard total load W0") for example. Here, the standard total load W0 is set to, for example, a standard load assumed for each type of vehicles, the weight of the vehicle without load, or the load on the vehicle for which it is determined by experimental trials that the applied friction torque is not needed to be changed.

More concretely, the controller 30 reduces the applied friction torque $T_c$ in accordance with a ratio of the standard total load W0 to the total load W. For example, the applied friction torque $T_c$ changed based on the load condition of the vehicle (hereinafter, referred to as "applied friction torque $T_{cn}$") is expressed by the following equations (1), (2) with using a correction amount "H".

$$Tcn = Tc \times H \quad (1)$$

$$H = \frac{W0}{W} \quad (2)$$

By the applied friction torque $T_{cn}$ set in this way, the correction amount H becomes smaller than 1 and the applied friction torque $T_{cn}$ also becomes smaller when the total load W is larger than the standard total load W0. Therefore, the controller 30 can prevent the deterioration of the steering capability due to the load conditions of the vehicle.

(Second Method)

Next, a description of the second method will be given. According to the second method, when the controller 30 determines that the rear-wheel load Wr is larger than the front-wheel load Wf, i.e., when the controller 30 determines that a ratio of rear-wheel load Wr to the total load W (hereinafter, referred to as "load distribution of rear wheels") is large, the controller 30 increases the applied friction torque $T_c$. Generally, when the load distribution of rear wheels is large, the capability of keeping the steering wheel deteriorates and the vehicle becomes unstable compared to the case where the front-wheel load Wf and the rear-wheel load Wr are balanced. Therefore, in the second method, by increasing the applied friction torque $T_c$, the controller 30 improves the capability of keeping the steering wheel and ensures the stability of the vehicle.

Concretely, using a ratio "Ar" corresponding to the load distribution of rear wheels and a ratio "Ar0" corresponding to a standard distribution of the rear-wheel load Wr (hereinafter, referred to as "rear wheel standard distribution"), the controller 30 determines the correction amount H by the following equation (3).

$$H = \frac{Ar}{Ar0} \quad (3)$$

Here, the ratio Ar is expressed by the following equation (4).

$$Ar = \frac{Wr}{Wf + Wr} \quad (4)$$

In addition, the ratio Ar0 is expressed by the following equation (5).

$$Ar0 = \frac{Wr0}{Wf0 + Wr0} \quad (5)$$

Here, "Wf0" indicates a standard load of the front wheels, and "Wr0" indicates a standard load of the rear wheels. Thus, the sum of the load Wf0 and the load Wr0 corresponds to the standard total load W0. Now, the ratio Ar0 corresponding to the rear wheel standard distribution is set to a ratio corresponding to the standard load of the rear wheels assumed for each type of vehicles, a ratio corresponding to the load distribution of rear wheels in a vehicle without load, or a ratio corresponding to the load distribution of rear wheels for which it is determined by experimental trials that the applied friction torque needs to be changed, for example. Thus, when the ratio Ar corresponding to the load distribution of rear wheels is large, the correction amount H becomes large and the applied friction torque $T_{cn}$ also becomes large compared to the case where the ratio Ar corresponding to the load distribution of rear wheels is small. Therefore, the controller 30 can improve the capability of keeping the steering wheel and stabilizes the vehicle even when the load distribution of rear wheels is large.

It is noted that the controller 30 may determine which one of the first method and the second method should be used by the types of vehicles. Concretely, the controller 30 applies the first method to a vehicle, such as a sports car, the rear-wheel load Wr of which is relatively small and for which a good steering capability is important. The controller 30 applies the second method to a vehicle, such as a normal-type vehicle, which has a rear seat or which is capable of carrying cargoes in the rear part. The controller 30 may also apply the combination of the first method and the second method as the following third method.

(Third Method)

Next, a description of the third method will be given. According to the third method, the controller 30 reduces the applied friction torque $T_c$ when the total load W is large, and increases the applied friction torque $T_c$ when the load distribution of rear wheels is large.

A description will be given of an example of calculating the correction amount H according to the third method. First, the controller 30 calculates the pre-normalized correction amount "H1" considering the equation (2), which is used for calculating the correction amount H in the first method, and the equation (4), which is used for calculating the ratio Ar corresponding to the load distribution of rear wheels in the second method. Then, the controller 30 normalizes the pre-normalized correction amount H1 so that the correction amount H becomes 1 when the total load W equals the standard total load W0 and the ratio Ar corresponding to the load distribution of rear wheels equals the ratio Ar0 corresponding to the rear wheel standard distribution. In other words, the controller 30 sets an initial correction amount "H0", and calculates the correction amount H by dividing the pre-normalized correction amount H1 by the initial correction amount H0. More concretely, assuming that "G1" indicates the weighting coefficient of the equation (2) and "G2" indicates the weighting coefficient of the equation (4), the pre-normalized correction amount H1, the initial correction amount H0 and the correction amount H are expressed by each of the following equations (6-1) to (6-3).

$$H1 = \frac{(Wf0 + Wr0)}{Wf + Wr} \times G1 + \frac{Wr}{Wf + Wr} \times G2 \quad (6\text{-}1)$$

$$H0 = G1 + \frac{Wr0}{Wf0 + Wr0} \times G2 \quad (6\text{-}2)$$

$$H = \frac{H1}{H0} \quad (6\text{-}3)$$

In the equations (6-1) to (6-3), the steering capability is emphasized when the weighting coefficient G1 is relatively larger than the weighting coefficient G2. Namely, in this case, the correction amount H is set to a value which is close to the correction amount H calculated by the first method. In contrast, when the weighting coefficient G2 is larger than the weighting coefficient G1, the capability of keeping the steering wheel is improved and the stability of the vehicle is more emphasized. Namely, in this case, the correction amount H is set to a value which is close to the correction amount H calculated by the second method. Each of the weighting coefficients G1, G2 is set to a proper value according to types of vehicles to be applied, for example by experimental trials. In addition, the initial correction amount H0 is a value calculated by the equation (6-1) of the pre-normalized correction amount H1 in which the front-wheel load Wf is replaced with the load Wf0 and the rear-wheel load Wr is replaced with the load Wr0. As shown in the equation (6-3), by setting the correction amount H to the value obtained by dividing the pre-normalized correction amount H1 by initial correction amount H0, the correction amount H is set to 1, i.e., the value which makes the applied friction torque $T_c$ unchanged, when the front-wheel load Wf is the load Wf0 and the rear-wheel load Wr is the load Wr0. As described above, by the third method, the controller 30 can set the correction amount H considering both the steering capability and the safety of the vehicle.

(Stroke Amount Correcting Method on Sloping Road)

Next, the description will be given of a method for correcting the stroke amounts when the stoke amounts are detected on a sloping road. Generally, the stoke amounts obtained on a flat road differ from the stoke amounts obtained on a sloping road, even when the loads on the vehicles in the two cases are the same. For example, even for a vehicle whose rear-load Wr and front-load Wf are actually the same, the rear-wheel load Wr is larger than the front-wheel load Wf when the stroke amounts are detected in a condition where the vehicle stops on an ascending slope. Namely, in this case, the stroke amounts are detected which shows that the rear-wheel load Wr is larger than the front-wheel load Wf. Therefore, when the controller 30 detects the stroke amounts on a sloping road, the controller 30 needs to correct the detected stroke amounts to the stroke amounts on a flat road (i.e., which has 0-degree slope) in order to estimate load conditions accurately.

So, when the controller 30 has obtained the stroke amounts on a sloping road, the controller 30 corrects the detected stroke amounts FR, FL, RR, RL in accordance with the gradient of the sloping road. A description will be given of an example of the correction method. First, a map (correspondence table) showing the relation between the stroke amounts detected on a sloping road and the stroke amounts detected on a flat road is prepared, for each gradient, by experimental trials in advance, and the controller 30 stores the above map in its memory. Then, with reference to the above map, the controller 30 corrects the detected stroke amounts FR, FL, RR, RL to the stroke amounts detected on a flat road based on the gradient of sloping road. In addition, the controller 30 calculates the gradient of a road, i.e., a gradient of a sloping road, from a difference between a real vehicle acceleration and an acceleration component of the vehicle obtained for example by a G-sensor on the vehicle, i.e., the gradient vehicle acceleration sensor or the acceleration sensor on the vehicle, which is not shown.

(Process Flow)

Figure 5:
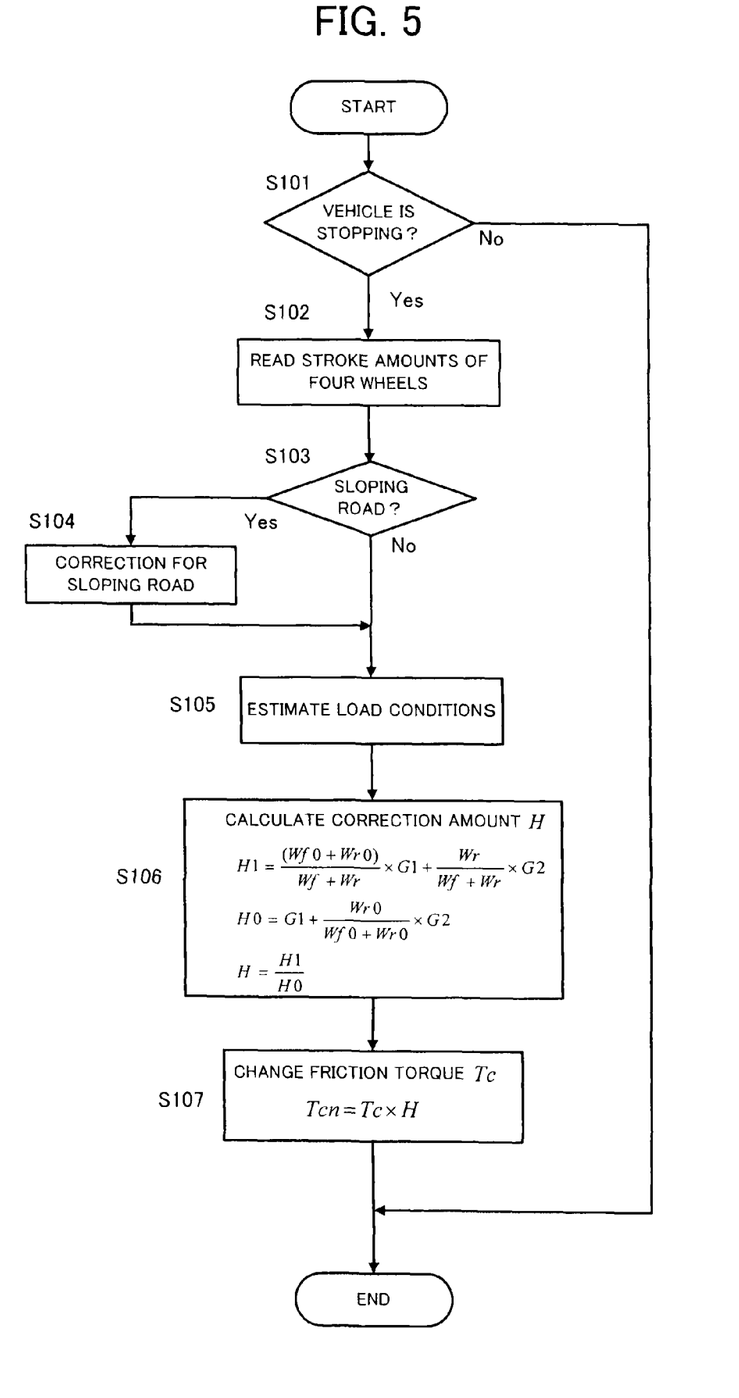
FIG. 5 is a flowchart of a control process according to a first embodiment.

Next, a description will be given of a procedure of the process according to the first embodiment. FIG. 5 is a flowchart showing an example of the control by the controller 30 according to the first embodiment. Hereinafter, the third method will be explained as a typical example. This process is repeatedly executed by the controller 30 in a predetermined cycle, for example.

First, the controller 30 determines whether or not the vehicle is stopping (step S101). Then, when the controller 30 determines that the vehicle is not stopping (step S101; No), the controller 30 ends the process of the flowchart.

On the other hand, when determining that the vehicle is stopping (step S101; Yes), the controller 30 reads the stroke amounts of the wheels 12FR, 12FL, 12RR, 12RL (step S102). Concretely, the controller 30 obtains the stroke amounts FR, FL, RR, RL from the suspension stroke sensors 16.

Next, the controller 30 determines whether or not the vehicle is stopping on a sloping road (step S103). Concretely, the controller 30 determines whether or not the road is aslope based on a detected value by G-sensor not shown, and additionally calculates the gradient if the road is aslope.

Then, when determining that the vehicle is on a sloping road (step S103; Yes), the controller 30 corrects the stroke amounts obtained at step S102 by the sloping road correction (step S104). Concretely, as mentioned above, the controller 30 corrects the detected stroke amounts FR, FL, RR, RL to the stroke amounts corresponding to the values detected on a flat road, based on the gradient of the sloping road.

Then, the controller 30 estimates the load conditions of the vehicle (step S105). Namely, the controller 30 calculates the front-wheel load Wf, the rear-wheel load Wr and the total load W (=Wf+Wr) based on the stroke amounts FR, FL, RR, RL obtained at step S102 or the stroke amounts corrected at step S104.

Next, the controller 30 calculates the correction amount H based on the load conditions of the vehicle (step S106). Concretely, the larger the total load W is, the more controller 30 decreases the pre-normalized correction amount H1. The larger the ratio Ar corresponding to the load distribution of rear wheels (see the equation (4)) is, the more the controller 30 increases the pre-normalized correction amount H1. These increase and decrease of the pre-normalized correction amount H1 are weighted according to the weighting coefficients G1 and G2. In addition, the controller 30 calculates the correction amount H by dividing the pre-normalized amount H1 by the initial amount H0.

Then, the controller 30 changes the applied friction torque $T_c$ (step S107). Concretely, while the vehicle is running, the controller 30 calculates the applied friction torque $T_c$ based on the steering angle θ and the target steering angle $θ_t$, and then multiplies the above applied friction torque $T_c$ by the correction amount H. In this way, the controller 30 can calculate the applied friction torque $T_{cn}$ considering the steering capability and the stability of the vehicle based on the load conditions of the vehicle.

In FIG. 5, the controller 30 calculates the correction amount H by the third method. In calculating the correction amount H by the first method instead, the controller 30 calculates the correction amount H according to the equation (2) at step S106. Additionally, in calculating the correction amount H by the second method, the controller 30 calculates the correction amount H according to the equation (3).

(Modification)

In the above explanation for the first method to the third method, the applied friction torque $T_c$ is multiplied by the correction amount H, but the present invention is not limited to the explanation. For example, instead of this, the controller 30 may subtract a value, obtained by multiplying a constant by the correction amount H, from the applied friction torque $T_c$. For another example, the controller 30 may calculate the applied friction torque $T_{cn}$ by any equation including the correction amount H and the applied friction torque $T_c$ as parameters. In either case, the controller 30 increases the applied friction torque $T_c$ when the correction amount H is larger than 1, and decreases the applied friction torque $T_c$ when the correction amount H is smaller than 1. In addition, the correction amount H may be a parameter of the gain K described in the section "Example of Friction Applying Control". In this case, for example, the gain K is expressed as the product of the correction amount H and the constant "K1" (K=H·K1), and the constant K1 is determined, for example, in consideration of a value other than the load conditions of the vehicle, such as the rigidity of the steering wheel 1. The above modification is also applied to the following second and third embodiments.

Similarly, the method of calculating the correction amount H is not limited to the above equation. For example, in the first method, instead of the above explanation, the controller 30 may calculate the correction amount H by the equation including the ratio of the standard total load W0 to the total load W (W0/W) as a parameter. For another example, the controller 30 may set the correction amount H based on the difference (W−W0) between the standard total load W0 and the total load W in the first method. In this case, the controller 30 changes the applied friction torque $T_c$ only when the total load W is larger than the standard total load W0. In the explanations of the second method, the third method, and the following second embodiment, similar transformations of the equations are also possible. For example, in the third method, the controller 30 may multiply the applied friction torque $T_c$ by each of the correction amounts H obtained by the equations (2) and (3), instead of multiplying the applied friction torque $T_c$ by the correction amount H obtained by the equations (6-1) to (6-3).

Second Embodiment

In the first embodiment, the controller 30 calculates the correction amount H based on the total load W and/or the load distribution of rear wheels, i.e., by any one of the first method, the second method and the third method, and then changes the applied friction torque $T_c$. In contrast, in the second embodiment, instead or besides, the controller 30 determines whether or not the load distributions of the right and left sides of the vehicle are different. Then, when the load distributions of the right and left sides of the vehicle are different, the controller 30 increases the applied friction torque $T_c$. Thereby, the controller 30 enhances the stability of the vehicle further.

First, for convenience of explanation, a description will be given of a method of calculating the correction amount H considering only the load distributions of the right and left sides of the vehicle. In explanation of the following flowchart, a description will be given of the procedure of the process by the controller 30 combined with the first embodiment.

The controller 30 calculates the sum of the loads on the front wheel 12FR and the rear wheel 12RR (hereinafter, referred to as "right-wheel load Wrh"), which are arranged on the right side of the vehicle in FIG. 1. In addition, the controller 30 calculates the sum of the loads on the front wheel 12FL and the rear wheel 12RL (hereinafter, referred to as "left-wheel load Wlh"), which are arranged on the left side of the vehicle in FIG. 1. Then, the controller 30 increases the applied friction torque $T_c$ when the difference between the right-wheel load Wrh and the left-wheel load Wlh, i.e., the load difference between the right and left sides of the vehicle is large. Concretely, when the right-wheel load Wrh is larger than the left-wheel load Wlh, the controller 30 sets the correction amount H as the following equation (7), for example.

$$H = \frac{Wrh}{Wlh} \quad (7)$$

Meanwhile, when the right-wheel load Wrh is larger than the left-wheel load Wlh, the controller 30 calculates the correction amount H by the equation (7) whose numerator and denominator are interchanged. Thereby, the correction amount H necessarily becomes equal to or larger than 1, and the larger the difference between the right-wheel load Wrh and the left-wheel load Wlh is, the larger the correction amount H becomes. Namely, the larger the difference between the right-wheel load Wrh and the left-wheel load Wlh is, the more the controller 30 increases the applied friction torque $T_c$. Generally, when the difference between the right-wheel load Wrh and the left-wheel load Wlh is large, the capability of keeping the steering wheel deteriorates, and there is a possibility that the vehicle becomes unstable. Therefore, when the difference between the right-wheel load Wrh and the left-wheel load Wlh is large, the controller 30 increases the applied friction torque T, thereby to stabilize the steering wheel and the vehicle.

(Process Flow)

Figure 6:
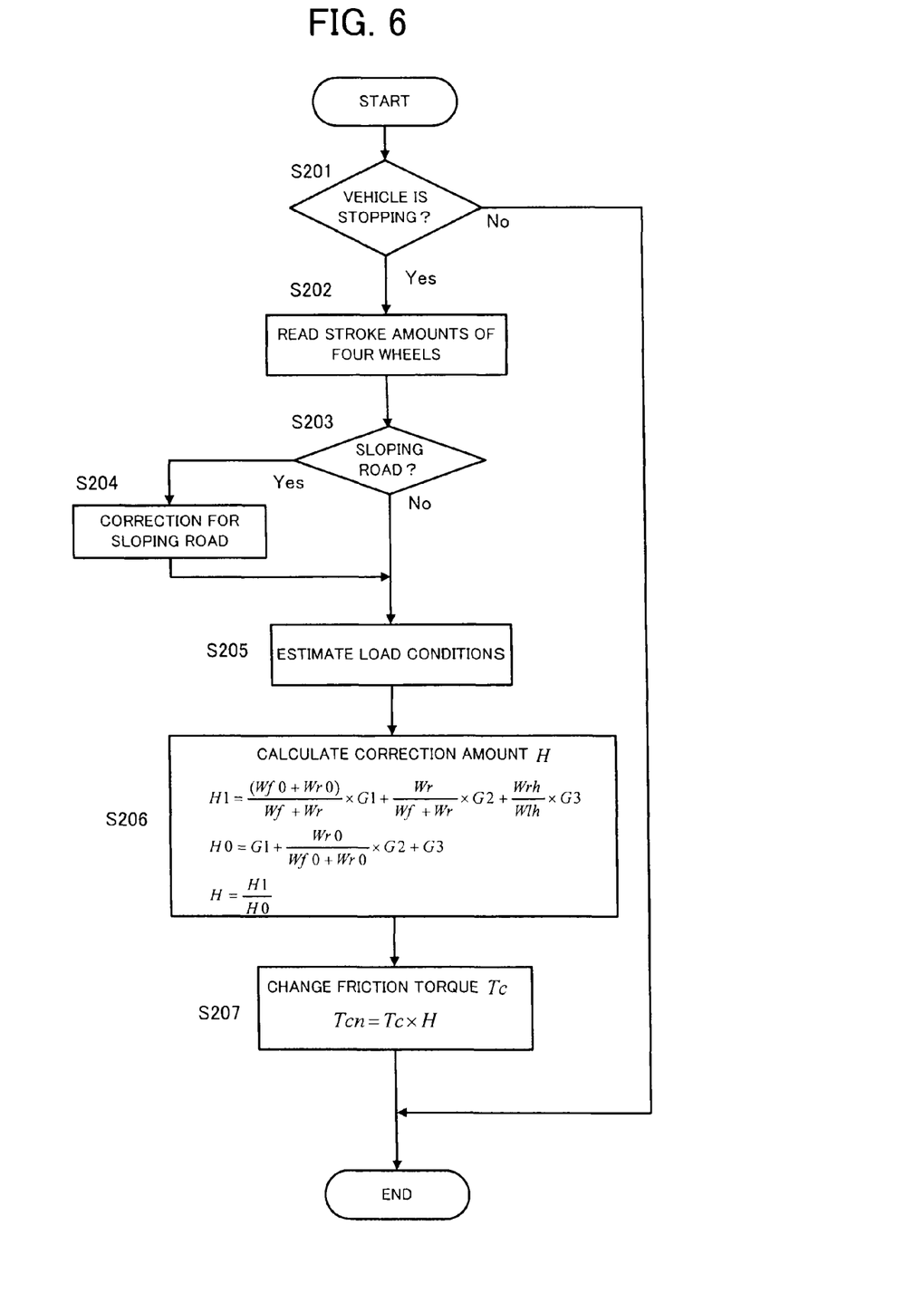
FIG. 6 is a flowchart of a control process according to a second embodiment.

Next, a description will be given of a procedure of the process for the second embodiment. FIG. 6 is an example of a flowchart which the controller 30 executes in the second embodiment. Since the processes from step S201 to step S204 are the same as the processes from step S101 to step S104, the explanation thereof will be omitted. Here, a description will be given of a case where the right-wheel load Wrh is equal to or larger than the left-wheel load Wlh.

After executing step S201 to step S204, the controller 30 estimates the load conditions (step S205). Here, the controller 30 calculates the front-wheel load Wf, the rear-wheel load Wr, the right-wheel load Wrh, the left-wheel load Wlh and the total load W based on the stroke amounts FR, FL, RR, RL obtained at step S202 or those corrected at the step S204.

Next, the controller 30 calculates the correction amount H (step S206). Here, the larger the total load W (=Wf+Wr) is, the more controller 30 decreases the pre-normalization amount H1, and the larger the ratio Ar corresponding to the load distribution of rear wheels (see the equation (4)) becomes, the more the controller 30 increases the pre-normalization amount H1. In addition, the larger the difference between the right-wheel load Wrh and the left-wheel load Wlh is, the more the controller 30 increases the pre-normalization amount H1. Now, "G3" is the weighting coefficient for the difference between the right-wheel load Wrh and the left-wheel load Wlh. Also, the controller 30 calculates the correction amount H normalized by dividing the pre-normalized correction amount H1 by the initial correction amount H0.

Then, the controller 30 obtains the applied friction torque $T_{cn}$ considering the load conditions by multiplying the applied friction torque $T_c$ by the correction amount H (step S207). Thereby, the controller 30 can properly calculate the applied friction torque $T_{cn}$ considering the total load of the vehicle, the load distribution of rear wheels, and the difference between the right and left sides of the vehicle.

Third Embodiment

In the first embodiment and the second embodiment, the controller 30 estimates the load conditions based on the stroke amounts of the suspensions, and changes the applied friction torque $T_c$ to a proper value according to the load conditions. In the third embodiment, besides or instead, the controller 30 changes the applied friction torque $T_c$ considering the variation in the load conditions due to the acceleration and deceleration of the vehicle. Thereby, the controller 30 changes the applied friction torque $T_c$ properly even when the vehicle accelerates or decelerates.

First, a description will be given of a method for correcting the applied friction torque $T_c$ when the vehicle accelerates. When the vehicle accelerates, due to an inertial effect, the front-wheel load Wf decreases and the rear-wheel load Wr increases compared to the situation where the vehicle does not accelerate nor decelerate. Namely, the load distribution of rear wheels increases. Therefore, in this case, the controller 30 increases the applied friction torque $T_c$ similarly to the second method in the first embodiment. Thereby, the controller 30 can enhance the capability of keeping the steering wheel and improve the stability of the vehicle.

Next, a description will be given of a method for correcting the applied friction torque $T_c$ when the vehicle decelerates. When the vehicle decelerates, due to an inertial effect, the front-wheel load Wf increases and the rear-wheel load Wr decreases, in contrast to the case of the accelerating vehicle, compared to the situation where the vehicle does not accelerate nor decelerate. In this case, the steering gets heavier due to the increasing front-wheel load Wf. Therefore, when the vehicle decelerates, the controller 30 decreases the applied friction torque $T_c$. Thereby, the controller 30 can prevent the steering from getting unnecessarily heavy.

(Process Flow)

Figure 7:
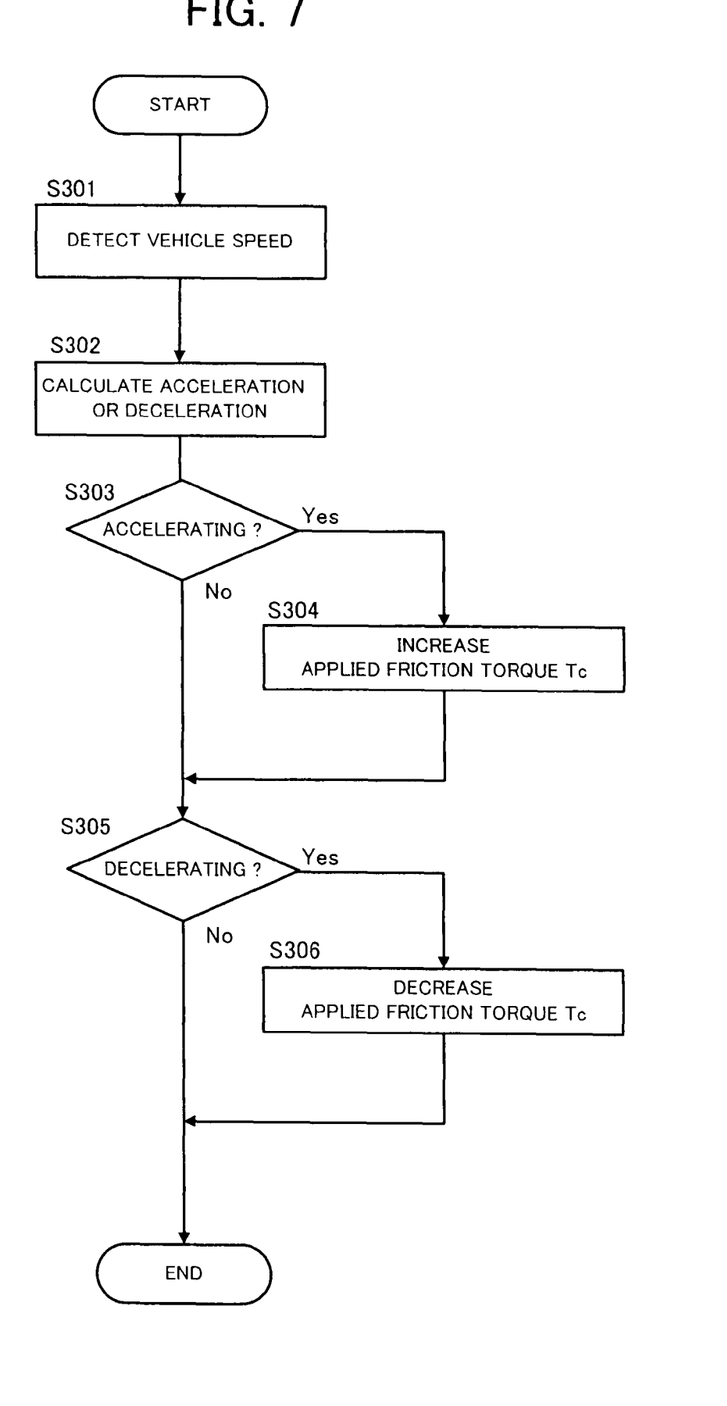
FIG. 7 is a flowchart of a control process according to a third embodiment.

Next, a description will be given of a procedure of the process in the third embodiment. FIG. 7 is a flowchart showing an example of a control by controller 30 in the third embodiment. The process shown in the FIG. 7 is repeatedly executed by the controller 30.

First, the controller 30 detects the vehicle speed (step S301). For example, the controller 30 detects the vehicle speed by a speed sensor not shown. Next, the controller 30 calculates the acceleration or deceleration (step S302). Concretely, the controller 30 determines whether the vehicle is accelerating or decelerating, and estimates the acceleration or deceleration by calculating the variation of the vehicle speed per unit time from the vehicle speed detected at step S302.

Then, when the controller 30 determines that the vehicle is accelerating (step S303; Yes), the controller 30 increases the applied friction torque $T_c$ (step S304). For example, the controller 30 sets the correction amount H with reference to a map showing the correction amounts H corresponding to the accelerations in the forward direction, which is prepared beforehand by experimental trials, and multiplies the applied friction torque $T_c$ by the correction amount H. In this case, the correction amount H is necessarily set to equal to or larger than 1. Thus, the controller 30 changes the applied friction torque $T_c$ to an increased value by the corrected amount H, and thereby the controller 30 enhances the capability of keeping the steering wheel and improves the stability of the vehicle.

Meanwhile, when determining that the vehicle is not accelerating (step S303; No), the controller 30 determines whether or not the vehicle is decelerating (step S305). Then, when determining that the vehicle is decelerating (step S305; Yes), the controller 30 decreases the applied friction torque $T_c$ (step S306). For example, the controller 30 sets the correction amount H with reference to a map showing the correction amounts H corresponding to accelerations in the backward direction, which is prepared beforehand by experimental trials, and multiplies the applied friction torque $T_c$ by the correction amount H. In this case, the correction amount H is set to be smaller than 1. Thus, the controller 30 changes the applied friction torque $T_c$ to a decreased value, and thereby the controller 30 can prevent the steering from getting unnecessarily heavy.

When determining that the vehicle is not decelerating (step S305; No), the controller 30 ends the process of the flowchart, and restarts the process of the flowchart after the elapse of a predetermined time period.

Thereby, the controller 30 can properly set the applied friction torque $T_c$ considering the movements of the load to front and rear in the vehicle when the vehicle is accelerating or decelerating.

In the explanation described above, the controller 30 decreases the applied friction torque $T_c$ when the vehicle is decelerating. Instead, the controller 30 may increase the applied friction torque $T_c$ in order to prevent a deflection of the vehicle at the time of braking. For example, the controller 30 may increase the applied friction torque $T_c$ in order to prevent the deflection of the vehicle, for particular kinds of vehicles which tend to cause the deflection of the vehicle, or when the vehicle is decelerating slowly and the load does not move to front and rear in the vehicle.

Also, the third embodiment can be applied to the first embodiment and the second embodiment. For example, the controller 30 multiplies the applied friction torque $T_c$ by the correction amount H which is calculated in the first embodiment or second embodiment, and then the controller 30 additionally calculates the applied friction torque $T_{cn}$ by multiplying the applied friction torque $T_c$ by the correction amount H calculated in the third embodiment.

INDUSTRIAL APPLICABILITY

This invention can be used for a vehicle including a mechanism which assist driver operations of a steering wheel.

The invention claimed is:

1. A power steering device mounted on a vehicle comprising:
   a friction torque setting unit which sets a friction torque applied to a steering wheel based on information indicating a situation of the vehicle;
   a target steering angle setting unit which sets a target steering angle based on the friction torque;
   a torque applying unit which sets an applied friction torque based on a deviation between the target steering angle and a steering angle, and which performs a control of applying the applied friction torque to the steering wheel; and
   an applied friction torque changing unit which changes the applied friction torque based on a load condition of the vehicle.

2. The power steering device according to claim 1, wherein the applied friction torque changing unit reduces the applied friction torque when a total load of the vehicle is large, compared to a time when the total load is small.

3. The power steering device according to claim 1, wherein the applied friction torque changing unit increases the applied friction torque when a load distribution of rear wheels is large, compared to a time when the load distribution is small.

4. The power steering device according to claim 1, wherein the applied friction torque changing unit increases the applied friction torque when a load difference between the right and left sides of the vehicle is large, compared to a time when the load difference is small.

5. The power steering device according to claim 1, wherein the applied friction torque changing unit changes the applied friction torque based on a condition of the vehicle in terms of acceleration and deceleration.

6. The power steering device according to claim 5, wherein the applied friction torque changing unit increases the applied friction torque when the vehicle is accelerating.

7. The power steering device according to claim 1, wherein the applied friction torque is applied in a direction opposite to a steering direction of the steering wheel.

* * * * *